United States Patent
Ito et al.

(10) Patent No.: US 8,430,791 B2
(45) Date of Patent: Apr. 30, 2013

(54) CONTROL DEVICE FOR VEHICULAR POWER TRANSMITTING APPARATUS

(75) Inventors: Masatoshi Ito, Okazaki (JP); Taiyo Uejima, Toyota (JP); Shunsuke Oyama, Aichi-gun (JP); Masaki Nomura, Anjo (JP); Tomokazu Nomura, Anjo (JP)

(73) Assignees: Toyota Jidosha Kabushiki Kaisha, Toyota (JP); Aisin AW Co., Ltd., Anjo (JP)

( * ) Notice: Subject to any disclaimer, the term of this patent is extended or adjusted under 35 U.S.C. 154(b) by 123 days.

(21) Appl. No.: 13/148,776

(22) PCT Filed: Jan. 29, 2010

(86) PCT No.: PCT/JP2010/051653
§ 371 (c)(1),
(2), (4) Date: Aug. 10, 2011

(87) PCT Pub. No.: WO2010/095523
PCT Pub. Date: Aug. 26, 2010

(65) Prior Publication Data
US 2011/0312468 A1   Dec. 22, 2011

(30) Foreign Application Priority Data
Feb. 19, 2009 (JP) ................................. 2009-037220

(51) Int. Cl.
*B60W 10/08* (2006.01)
(52) U.S. Cl.
USPC .................................................. 477/5
(58) Field of Classification Search .......... 477/5
See application file for complete search history.

(56) References Cited

U.S. PATENT DOCUMENTS

| | | | |
|---|---|---|---|
| 6,499,370 B2 * | 12/2002 | Bowen ........................... 74/330 |
| 7,223,201 B2 * | 5/2007 | Colvin et al. ..................... 477/5 |
| 8,177,005 B2 * | 5/2012 | Yamanaka et al. ......... 180/65.28 |
| 2008/0220933 A1 | 9/2008 | Maeda | |
| 2008/0300100 A1 | 12/2008 | Matsubara et al. | |
| 2009/0008168 A1 | 1/2009 | Yamanaka et al. | |

FOREIGN PATENT DOCUMENTS

| | | |
|---|---|---|
| EP | 0 173 117 A1 | 3/1986 |
| FR | 2 674 928 A1 | 10/1992 |
| JP | A-2003-113932 | 4/2003 |
| JP | A-2004-203219 | 7/2004 |

OTHER PUBLICATIONS

Office Action issued in Japanese Patent Application No. 2009-037220 dated May 15, 2012 (with partial translation).
International Search Report issued in International Application No. PCT/JP2010/051653 on May 7, 2010.
Written Opinion of the International Searching Authority issued in International Application No. PCT/JP2010/051653 on May 7, 2010.

* cited by examiner

*Primary Examiner* — Dirk Wright
(74) *Attorney, Agent, or Firm* — Oliff & Berridge, PLC (57) ABSTRACT

It is provided a control device for a vehicular power transmitting apparatus provided with a transmission disposed in a power transmitting path between an electric motor and drive wheels, the control device switching a synchronizing control method of the transmission in a kickdown shifting performed in the transmission to either one of a rotation-synchronization control by a hydraulic pressure control of the transmission and a rotation-synchronization control by the electric motor, depending on an input torque applied to the transmission at the beginning of the shifting.

4 Claims, 8 Drawing Sheets

|     | C1 | C2 | C3 | B1 | B2  | F1 |
|-----|----|----|----|----|-----|----|
| 1st | O  |    |    |    | (O) | O  |
| 2nd | O  |    |    | O  |     |    |
| 3rd | O  | O  |    |    |     |    |
| 4th |    | O  |    | O  |     |    |
| Rev |    |    | O  |    | O   |    |
| N   |    |    |    |    |     |    |

CONTROL DEVICE FOR VEHICULAR POWER TRANSMITTING APPARATUS

FIELD OF THE INVENTION

This invention relates to a control device for a vehicular power transmitting apparatus including a transmission disposed in a power transmitting path between an electric motor and drive wheels, and more particularly, to a technology of quickening a response and suppressing a shock in a kickdown shifting.

DESCRIPTION OF THE RELATED ART

There has heretofore been known a vehicular power transmitting apparatus of a hybrid type including a transmission disposed in a power transmitting path between an electric motor and drive wheels. In such a vehicular power transmitting apparatus, a drive force (torque) output from the electric motor can be amplified with the transmission and transmitted to the drive wheels. As the transmission for example a hydraulic type automatic transmission controlled with a hydraulic pressure may be used, in which a shifting is suitably performed depending on a running state of a vehicle. For instance, the transmission is shifted to a lower-speed gear position during a start-up of the vehicle for providing an increased drive force, then the transmission is shifted to a higher-speed gear position in an increased vehicle speed for decreasing a rotation speed of the electric motor. The execution of such a control can maintain the electric motor at favorable drive efficiency.

For instance, a control device for a hybrid drive apparatus disclosed in Patent Publication 1 (Japanese Patent Publication No. 2004-203219) is one example. In Patent Publication 1, a transmission (6) shiftable in two gear positions is interposed between a second motor generator (MG2) and an output shaft (2) connected to the drive wheels, and is suitably shifted depending on the running state. Patent Publication 1 also discloses a technology in which during the shifting of the transmission (6) with no torque being output from the motor generator (MG2) to the output shaft (2), a feedback control for controlling the rotation speed of the electric motor is performed under a state in which the transmission has a transmitting torque capacity smaller than a predetermined value. The feedback control is for controlling a rotation speed of the electric motor to match a synchronized rotation speed, or a target rotation speed determined based on the synchronized rotation speed after the shifting.

DISCLOSURE OF THE INVENTION

Meanwhile, with Patent Publication 1, in a kickdown shifting executed under a state with torque being output from the electric motor, a rotation-synchronization control is uniformly executed by controlling a hydraulic pressure of the transmission. This increases a synchronization time of the transmission, slowing the response during the shifting. Particularly, the rotation-synchronization control executed by the hydraulic pressure control of the transmission achieves a synchronized rotation with slipping a hydraulic clutch (hydraulic brake) incorporated in the transmission. Thus, there is a limit in shortening the synchronization time. Accordingly, the shifting is slower than that achieved when the rotation-synchronization control is executed by the electric motor.

On the contrary, executing the rotation-synchronization control by the electric motor with taking priority to the quick or quickened shifting response can shorten the synchronization time, which results in the quickened shifting response. However, since such a control interrupts the power transmitting in the transmission in outputting a torque from the electric motor, there occurs a fall or drop of a drive force during the execution of the rotation-synchronization control, causing a shifting shock.

The present invention has been completed with the above view in mind, and has an object to provide a control device for a vehicular power transmitting apparatus, having a transmission disposed in a power transmitting path between an electric motor and drive wheels, which can provide compatible effects of the quickened response and suppressed shock in the kickdown shifting.

For achieving the above object, a first aspect of the present invention provides a control device for a vehicular power transmitting apparatus provided with a transmission disposed in a power transmitting path between an electric motor and drive wheels. The control device is characterized in switching a synchronizing control method of the transmission in a kickdown shifting performed in the transmission to either one of a rotation-synchronization control by a hydraulic pressure control of the transmission and a rotation-synchronization control by the electric motor, depending on an input torque applied to the transmission at the beginning of the shifting.

A second aspect of the present invention is featured by in the first aspect that the synchronizing control method is switched to the rotation-synchronization control by the hydraulic pressure control of the transmission when the input torque applied to the transmission at the beginning of the kickdown shifting exceeds a predetermined value, whereas the synchronizing control method is switched to the rotation-synchronization control by the electric motor when the input torque does not exceed the predetermined value.

A third aspect of the present invention is featured by in the first or second aspect that when the synchronizing control method is switched to the rotation-synchronization control by the electric motor, the rotation-synchronization control by the electric motor continues until the shifting is completed in the transmission.

In the control device for a vehicular power transmitting apparatus of the first aspect, the control device switches a synchronizing control method of the transmission in a kickdown shifting performed in the transmission, to either one of a rotation-synchronization control by a hydraulic pressure control of the transmission and a rotation-synchronization control by the electric motor, depending on an input torque applied to the transmission at the beginning of the shifting.

The above structure allows an appropriate shifting to be executed depending on torque of the electric motor, resulting in the compatible effects of quickened response and the suppressed shifting shock in the kickdown shifting. For instance, when the kickdown shifting is performed by depressing an accelerator pedal under a state in which the input torque applied to the transmission is smaller, the rotation-synchronization control by the electric motor is performed. This achieves the rotation synchronization immediately, resulting in the quickened shifting response. Further, during the execution of the rotation-synchronization control by the electric motor, interruption of the power transmitting in the transmission may cause the fall of the drive force. However, owing to the smaller input torque applied to the transmission, the shifting shock associating therewith is suppressed. Furthermore, when the kickdown shifting is performed by depressing the accelerator pedal under the state in which the input torque applied to the transmission is larger, the rotation-synchronization control is performed by the hydraulic pressure control of the transmission. This can output the drive force continuously, then the fall of the drive force can be avoided, and the shifting shock can be suppressed. Thus, by switching the methods of rotation-synchronization controls of the transmission depending on the input torque applied to the transmission at the beginning of the shifting, compatible effects of the quickened shifting response and suppressed shifting shock can be obtained.

In the control device for a vehicular power transmitting apparatus of the second aspect, the synchronizing control method is switched to the rotation-synchronization control by the hydraulic pressure control of the transmission when the input torque applied to the transmission at the beginning of the kickdown shifting exceeds a predetermined value, whereas the synchronizing control method is switched to the rotation-synchronization control by the electric motor when the input torque does not exceed the predetermined value. If the input torque exceeds the predetermined value, the drive force can be continuously output with avoiding the fall thereof, so that the shifting shock is suppressed. Meanwhile, if the input torque applied to the transmission at the beginning of the kickdown shifting does not exceed the predetermined value or not, the synchronization control method is switched to the rotation-synchronization control by the electric motor. This achieves the rotation synchronization immediately, thereby quickening the shifting response. Thus, the rotation-synchronization control methods of the transmission can be appropriately switched depending on whether input torque applied to the transmission exceeds the predetermined value.

In the control device for a vehicular power transmitting apparatus of the third aspect, when the synchronizing control method is switched to the rotation-synchronization control by the electric motor, the rotation-synchronization control by the electric motor continues until the shifting is completed in the transmission. For instance, even if the accelerator pedal is further depressed during the shifting performed in the transmission, priority is given to the rotation-synchronization control by the electric motor, thereby providing quickened shifting response. In addition, the shifting shock caused by switching the synchronization control method to the rotation-synchronization control by the hydraulic pressure control of the transmission during the rotation-synchronization control by the electric motor can be prevented.

MODE FOR CARRYING OUT THE INVENTION

As used herein, preferably, "kickdown shifting" corresponds to a downshifting carried out when a vehicle a running state passes across a downshifting line in a shifting diagram composed of a vehicle speed preliminarily set, and demanded drive torque associating with a quickening in demanded drive torque by depression of accelerator pedal.

Further, preferably, "a rotation-synchronization control by an electric motor" refers to a control in which with setting a transmitting torque capacity of the transmission below a predetermined value by immediately disengaging a disengaging side engaging device in a shifting period, a rotation speed of the input shaft of the transmission is controlled to reach a synchronization rotation speed after the shifting, or a target rotation speed determined based on the synchronization rotation speed by an electric motor connected to an input shaft of the transmission after which an engaging side engaging device is engaged. With the execution of such a control, the electric motor immediately performs the rotation synchronization, to quicken the shifting response. However, if rotation synchronization is carried out in a state in which the transmission is input with predetermined input torque, decrease of the transmitting torque capacity of the transmission causes a fall of torque (drive force), resulting in the shifting shock.

Further, preferably, "a rotation-synchronization control by a hydraulic pressure control of the transmission" refers to a control in which holding states of the disengaging side engaging device and the engaging side engaging device of hydraulic friction engaging devices incorporated in the transmission are changed, with remaining them in slipping engagements (half engaged). Thus, an input-shaft rotation speed of the transmission matches with the synchronizing rotation speed subsequent to the shifting or the target rotation speed determined based on the synchronized rotation speed. With the execution of such a control, the transmission has a predetermined transmitting torque capacity even in a shifting period, thereby preventing the fall of drive force to avoid the occurrence of shifting shock. However, the rotation-synchronization control performed by the hydraulic pressure control increases the synchronization time, thereby slowing the shifting response.

Moreover, preferably, the predetermined value of input torque to the transmission is set to a value such that even if the rotation-synchronization control by the electric motor is executed with an input torque being applied to the transmission, the shifting shock due to the fall of drive force is small which does not cause the shock noticeable by a driver. With such setting, the rotation-synchronization control by the electric motor can be executed under a state in which for instance the output torque of the electric motor is smaller than a predetermined value. This quickens shifting response, and suppresses the shifting shock.

Now, embodiments of the present invention will be described below in detail with reference to the accompanying drawings. Meanwhile, in the embodiments described below, the drawings are suitably simplified or modified in shape and various component parts are not necessarily and precisely plotted in dimensional ratio and shape, etc.

Embodiment 1

Figure 1:
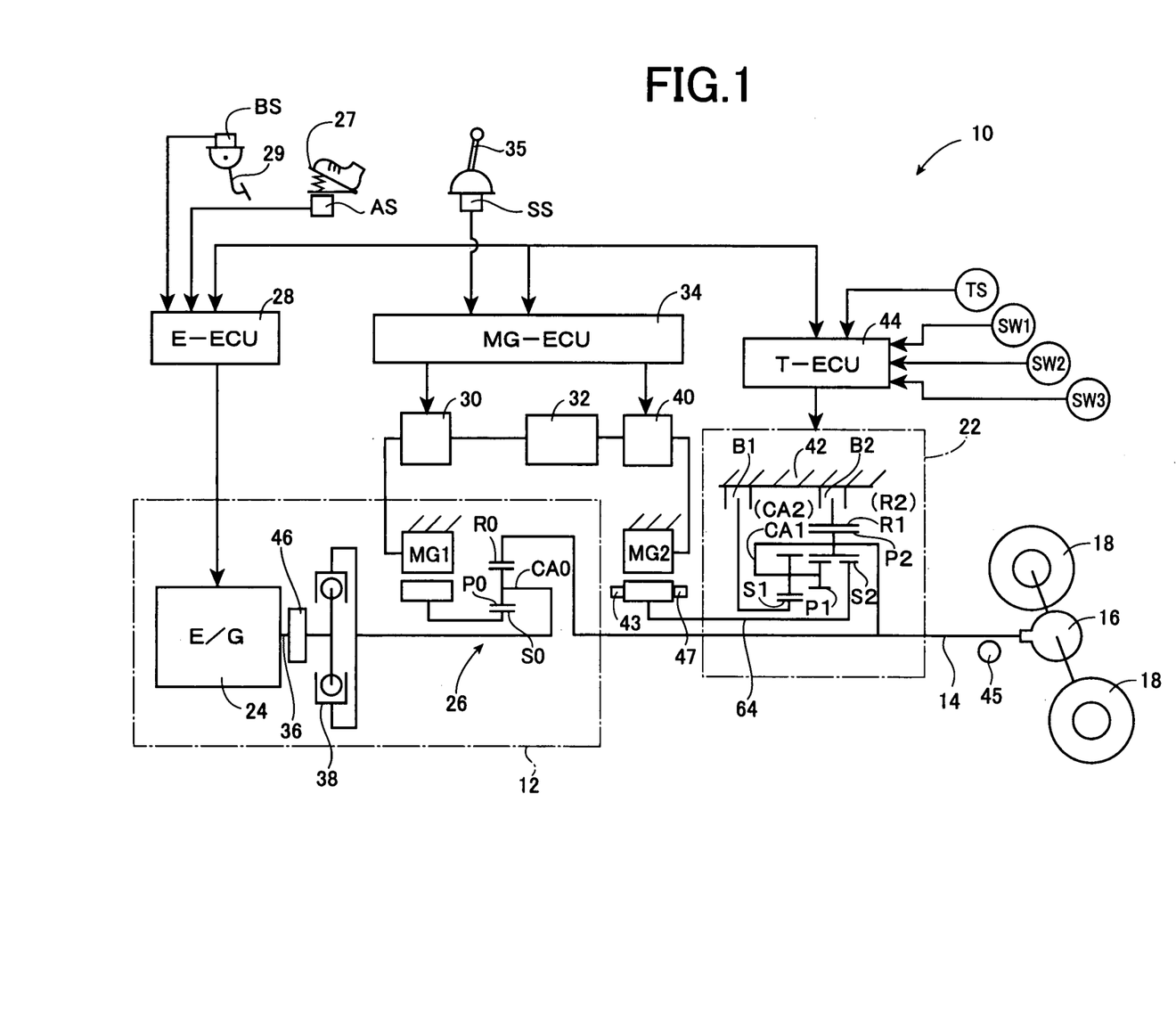
FIG. 1 is a schematic structural view illustrating a hybrid-vehicle power transmitting apparatus (vehicular power transmitting apparatus) to which the present invention is applied.

Referring to the schematic view of FIG. 1 for explaining a hybrid type vehicular power transmitting apparatus 10 to which the present invention is applicable, the vehicular power transmitting apparatus 10 is arranged such that a torque of a main drive power source functioning as a first drive power source 12 is transmitted to a wheel-side output shaft (hereinafter referred to "output shaft") 14 functioning as an output member, and then it is transmitted to a pair of right and left drive wheels 18 through a differential gear device 16. The vehicular power transmitting apparatus 10 is provided with, as a second drive power source, a second electric motor MG2 which is operable to selectively perform a torque generating operation to generate a vehicle drive force and a regenerative operation to recover a kinetic energy. This second electric motor MG2 is connected to the output shaft 14 through an automatic transmission 22 (corresponding to "transmission" in the present invention). Accordingly, an output torque to be transmitted from the second electric motor MG2 to the output shaft 14 is increased or reduced according to a speed ratio $\gamma$s set by the automatic transmission 22 (equal to rotating speed Nmg2 of the second electric motor MG2/rotating speed Nout of the output shaft 14).

The automatic transmission 22 which is disposed in a power transmitting path between the second electric motor MG2 (corresponding to "electric motor" in the present invention) and the drive wheels 18, can have a plurality of values of the speed ratio $\gamma$s which are higher than "1", so that the torque generated by the second electric motor MG2 during its torque generating operation and to be transmitted to the output shaft 14 can be increased by the automatic transmission 22. Thus, the required capacity and size of the second electric motor MG2 can be made relatively small. When the rotating speed Nout of the output shaft 14 is relatively high during a vehicle running at a relatively high speed, a rotation speed Nmg2 of the second electric motor MG2 (hereinafter referred to as "second electric motor rotation speed Nmg2") is lowered by reducing the speed ratio $\gamma$s, for maintaining the second electric motor MG2 in a highly efficient operating state. When the rotating speed Nout of the output shaft 14 is relatively low, the second electric motor rotation speed Nmg2 is raised by increasing the speed ratio $\gamma$s.

The first drive power source 12 indicated above is constituted principally by an engine 24 as a main drive power source, a first electric motor MG1, and a planetary gear set 26 as a power distributing mechanism operable to synthesize a torque of the engine 24 and a torque of the first electric motor MG1 or distribute one of these torques to the engine 24 or the first electric motor MG1. The engine 24 is a known internal combustion engine such as a gasoline or diesel engine operable to generate a drive force by combustion of a fuel. An operating state of the engine 24 is electrically controlled by an electronic engine control device (E-ECU) 28 constituted principally by a microcomputer, which is configured to control an opening angle of a throttle valve, an intake air quantity, an amount of supply of a fuel and an ignition timing of the engine 24. The electronic engine control device 28 is arranged to receive output signals of various sensors such as an accelerator operation-amount sensor AS provided to detect an operation amount of an accelerator pedal 27, and a brake sensor BS provided to detect an operation of a brake pedal 29.

The first electric motor MG1, which is a synchronous motor for example, is operable to function selectively as an electric motor to generate a drive torque, and an electric generator. The first electric motor MG1 is connected through an inverter 30 to an electric-energy storage device 32 such as a battery or capacitor. An output torque or a regenerative torque of the first electric motor MG1 is regulated or set by an electronic motor-generator control device (MG-ECU) 34 constituted principally by a microcomputer which controls the inverter 30. The electronic motor-generator control device 34 is arranged to receive output signals of various sensors such as a shift position sensor SS provided to detect an operating position of a shift lever 35.

The planetary gear set 26 is a planetary gear mechanism of a single-pinion type which is operable to perform a known differential function and which includes three rotary elements consisting of a sun gear S0, a ring gear R0 disposed coaxially with the sun gear S0, and a carrier CA0 which supports a pinion gear P0 meshing with the sun gear S0 and ring gear R0 to be rotatable about its axis and about an axis of the carrier CA0. The planetary gear device 26 is disposed coaxially with the engine 24 and the automatic transmission 22. Since the planetary gear device 26 and automatic transmission 22 are symmetric about their axes, a low half thereof is omitted in FIG. 1.

In the present vehicular power transmitting apparatus 10, a crankshaft 36 of the engine 24 is connected to the carrier CA0 of the planetary gear device 26 through a damper 38, and the first electric motor MG1 is connected to the sun gear S0, while the output shaft 14 is connected to the ring gear R0. It is noted that the carrier CA0 functions as an input element, and the sun gear S0 functions as a reaction element, while the ring gear R0 functions as an output element.

Figure 2:
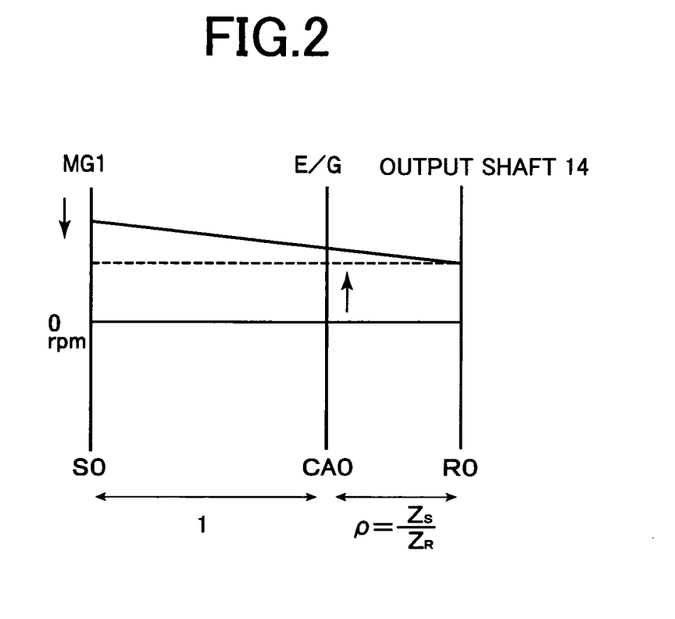
FIG. 2 is a collinear chart representing the correlation between rotation speeds of respective rotary elements of a planetary gear unit functioning as a power distributing mechanism.

The collinear chart of FIG. 2 indicates relative rotating speeds of the rotary elements of the single-pinion type planetary gear set 26 functioning as the power distributing mechanism. In this collinear chart, the rotating speeds of the sun gear S0, carrier CA0 and ring gear R0 are taken along respective vertical axes S0, CA0 and R0. Distances between adjacent ones of the vertical axes S0, CA0, R0 are determined such that the distance between the vertical axes CA0 and R0 corresponds to $\rho$ (number of teeth Zs of the sun gear S0/number of teeth Zr of the ring gear R0), where the distance between the vertical axes S0 and CA0 corresponds to "1".

In the planetary gear device 26, a directly transmitted torque appears on the ring gear R0 functioning as the output element when a reaction torque, generated by the first electric motor MG1 as a result of input of the output torque of the engine 24 to the carrier CA0, is input to the sun gear S0. In this case, the first electric motor MG1 functions as the electric generator. Further, a rotating speed Ne of the engine 24 (hereinafter referred to as "engine rotating speed Ne") can be variable continuously (in a non-stepping manner) by changing a rotating speed Nmg1 of the first electric motor MG1, while the rotating speed of the ring gear R0, that is, the rotating speed Nout of the output shaft 14 (output shaft rotating speed Nout) is held constant. Broken line in FIG. 2 indicates a drop or a fall of the engine speed Ne when the rotating speed Nmg1 of the first electric motor MG1 is lowered from a value indicated by solid line. Namely, the engine speed Ne can be controlled to a value for highest fuel economy by controlling the first electric motor MG1. The hybrid drive system 10 of this type is called as a mechanical distribution type or split type.

Referring back to FIG. 1, the automatic transmission 22 is constituted by one set of planetary gear mechanisms of a Ravigneaux type. Described in detail, the automatic transmission 22 includes a first sun gear S1 and a second sun gear S2, wherein a stepped pinion P1 has a large-diameter portion meshing with the first sun gear S1, a second pinion P2 meshes with a small-diameter portion of the stepped pinion P1, and a ring gear R1 (R2) is disposed coaxially with the first and second sun gears S1, S2 and meshes with the pinion P2. The pinions P1, P2 are supported by a common carrier CA1 (CA2) to be rotatable about its axis and about the axis of the common carrier CA1 (CA2). Further, the second sun gear S2 meshes with the pinion P2.

The second electric motor MG2, which functions as an electric motor or an electric generator, is controlled by the electronic motor-generator control device (MG-ECU) 34 through an inverter 40, to adjust or set an assisting output torque or a regenerative torque. The second electric motor MG2 is connected to the second sun gear S2, and the output shaft 14 is connected to the carrier CA1. The first sun gear S1 and the ring gear R1 cooperate with the pinions P1, P2 to constitute a planetary gar set of a double-pinion type, while the second sun gear S2 and the ring gear R1 cooperate with the pinion P2 to constitute a planetary gear set of a single-pinion type.

The automatic transmission 22 is provided with a first brake B1 disposed between the first sun gear S1 and a housing 42 as a non-rotatable member to selective fix the first sun gear S1 to the housing 42, and a second brake B2 disposed between the ring gear R1 and the housing 42 to selectively fix the ring gear R1 to the housing 42. These brakes B1, B2 are so-called frictional coupling or engaging devices arranged to generate a frictional braking force, which may be of a multiple-disc type or a band type. Torque capacities of the brakes B1, B2 are continuously variable according to engaging hydraulic pressures generated by respective first and second brake actuators such as hydraulic cylinders, for example.

The automatic transmission 22 constructed as described above is placed in a high gear position H having a speed ratio γsh higher than "1" when the second sun gear S2 functions as an input element, and the carrier CA1 functions as an output element, while the first brake B1 is placed in an engaged state. When the second brake B2 instead for the first brake B1 is placed in an engaged state, the automatic transmission 22 is placed in a low gear position L having a speed ratio γsl higher than the speed ratio γsh. That is, the automatic transmission 22 has two speed positions or gear positions H, L, which are selectively established on the basis of a running condition of the vehicle such as a running speed V of the vehicle and a required vehicle drive force (or the operating amount of the accelerator pedal). Described more specifically, the automatic transmission 22 is shifted to establish one of the two gear positions H, L on the basis of the detected running condition of the vehicle and according to a predetermined map (shifting diagram) defining gear position areas in advance. The shifting actions of the automatic transmission 22 are controlled by an electronic control device (T-ECU) 44 constituted principally by a microcomputer.

The electronic control device 44 is arranged to receive rotating speed signals from various sensors such as an second electric motor speed sensor 43 provided to detect the second electric motor rotating speed Nmg2, and an output-shaft rotating speed sensor 45 provided to detect the output shaft rotating speed Nout corresponding to the vehicle speed V. The electronic control device 44 further receives output signals of an second electric motor MG2 temperature sensor 47 provided to detect a temperature THmg2 of the second electric motor MG2 (hereinafter referred to as "second electric motor temperature"), an oil temperature sensor TS provided to detect a temperature THoil of a working oil of the automatic transmission 22 which is also used for lubricating and cooling the first electric motor MG1, second electric motor MG2, a hydraulic pressure switch SW1 provided to detect the engaging hydraulic pressure of the first brake B1, and a hydraulic pressure switch SW2 provided to detect the engaging hydraulic pressure of the second brake B2.

The electronic transmission control device 44 further receives a signal indicative of a temperature THbat of the electronic-energy storage device 32 (hereinafter referred to as "battery temperature"); a signal indicative of a charging or discharging current Icd of the electric-energy storage device 32 (hereinafter referred to as "charging/discharging current" or "input/output current"); a signal indicative of a voltage Vbat of the electronic-energy storage device 32; a signal indicative of a charging capacity (charging state) of the electric-energy storage device 32 calculated on the basis of the above-indicated battery temperature THbat, charging/discharging current Icd and voltage Vbat; signals indicative of temperatures of the inverters 30, 40; and a signal indicative of a temperature of a coolant used for cooling the inverters 30, 40.

Figure 3:
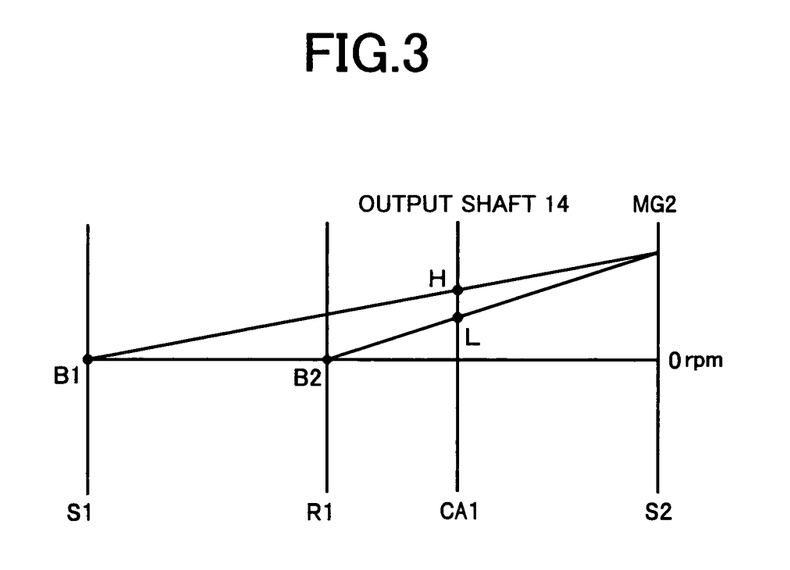
FIG. 3 is a collinear chart representing the correlation between rotation speeds of respective rotary elements of a Ravigneaux planetary gear unit forming an automatic transmission.

A collinear chart of FIG. 3 has four vertical axes S1, R1, CA1 and S2 indicating a relationship among the rotary elements of the Ravigneaux type planetary gear mechanism constituting the automatic transmission 22. The respective vertical axes S1, R1, CA1 and S2 show the rotating speeds of the first sun gear S1, ring gear R1, carrier CA1 and second sun gear S2.

The automatic transmission 22 constructed as described above is shifted to the low gear position L when the second brake B2 is engaged to fix the ring gear R1 to the housing 42. In this low gear position L, the assisting torque generated by the second electric motor MG2 is amplified according to the speed ratio γsl, and the amplified assisting torque output from the second electric motor MG2 is transmitted to the output shaft 14. When the first brake B1 is engaged to fix the first sun gear S1 to the housing 42, the automatic transmission 22 is shifted to the high gear position H having the speed ratio γsh lower than the speed ratio γsl of the low gear position L. The speed ratio γsh of the high gear position H is also higher than "1", so that the assisting torque generated by the second electric motor MG2 is, after being amplified according to the speed ratio γsh, transmitted to the output shaft 14.

While the automatic transmission 22 is constantly held in the low or high gear position L, H, the output torque of the second electric motor MG2 as amplified according to the speed ratio γsl or γsh of the automatic transmission 22 is transmitted to the output shaft 14. In the process of the shifting action of the automatic transmission 22 to the low or high gear position L, H, however, the torque subject to an influence of the torque capacities of the first or second brake B1, B2 and a change of an inertia torque of the automatic transmission 22 is transmitted to the output shaft 14. Further, the torque added to the output shaft 14 is a positive torque during the driving state of the second electric motor MG2, and is a negative torque during the driven state of the second electric motor MG2. In the driven state, the second electric motor MG2 is driven by a rotary motion of the output shaft 14 transmitted through the automatic transmission 22, not necessarily corresponding to a driving state or a non-driving state of the vehicle.

Figure 4:
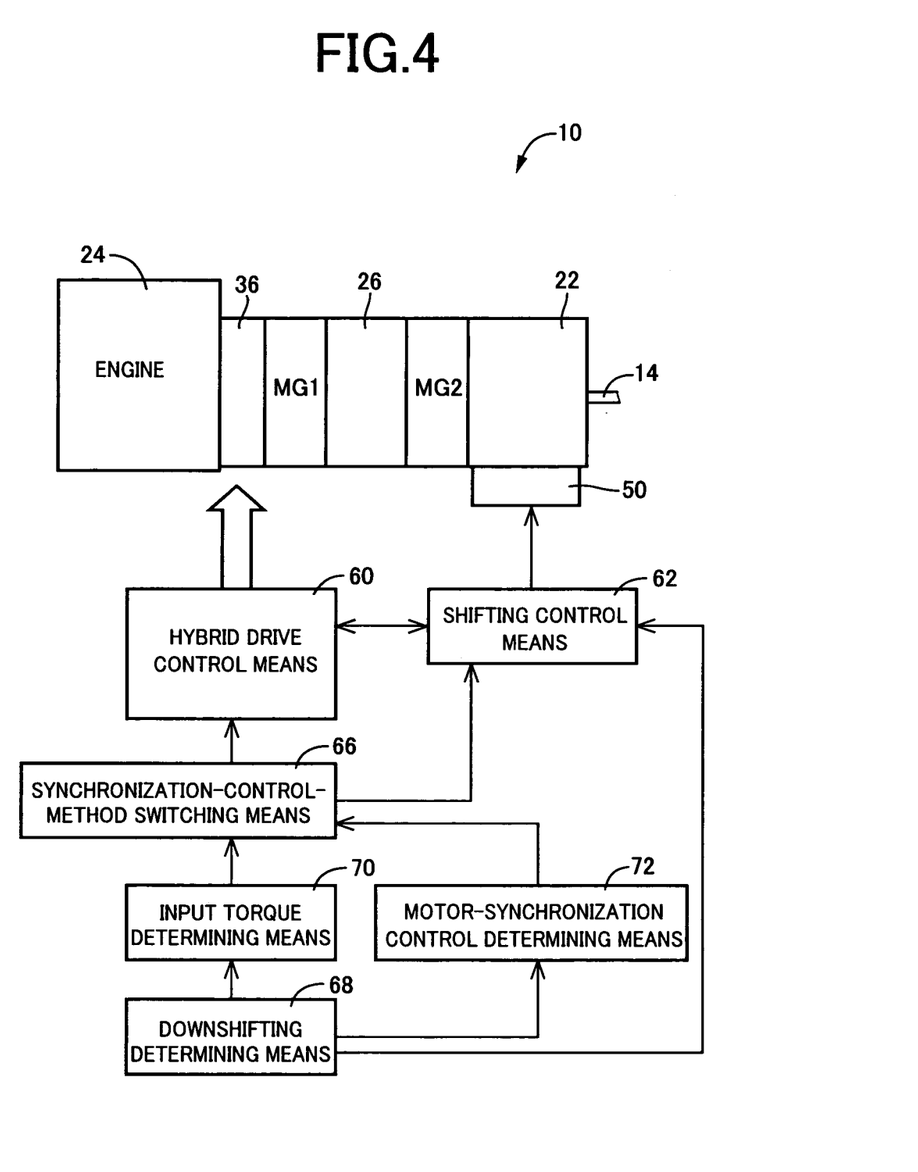
FIG. 4 is a functional block diagram illustrating a major part of a control function of an electronic control device.

FIG. 4 is a functional block diagram illustrating major parts of control functions of the electronic control devices 28, 34 and 44. In FIG. 4, hybrid drive control means 60 performs a control for an engine 24 and/or a second electric motor MG2 to provide a demanded output. For instance, a key is inserted to a key slot, and a power switch is subsequently operated with a brake pedal being depressed to start up such a control. Then, the hybrid drive control means 60 calculates the demanded output of a driver based on a resulting accelerator displacement amount to cause the engine 24 and/or the second electric motor MG2 to provide the demanded output in a low-fuel consumption with a less amount of exhaust gases. For instance, the hybrid drive control means 60 switches running modes, depending on a running state, to a motor running mode in which the engine 24 is halted and the second electric motor MG2 is mainly used as a drive power source; a running and charging mode in which the first electric motor MG1 is operated to generate electric power by a drive power of the engine 24 and the vehicle runs by the second electric motor MG2 acting as the drive power source; and an engine running mode in which a drive power of the engine 24 is mechanically transmitted to drive wheels 18 to drive the vehicle.

The hybrid drive control means 60 controls the engine rotation speed Ne using the first electric motor MG1 such that the engine 24 operates on an optimum fuel economy curve. Further, in driving the second electric motor MG2 to provide an assist torque, the automatic transmission 22 is set to a lower-speed gear position L for additionally applying an increasing torque to the output shaft 14 when the vehicle speed V remains in a low state. When the vehicle speed V increases, the automatic transmission 22 is set to a higher-speed gear position H to relatively lower the second electric-motor rotation speed Nmg2 for reducing the loss, for executing a torque assist with high efficiency. During a coast running, furthermore, the first electric motor MG1 or the second electric motor MG2 are rotatably driven by inertial energy of the vehicle to regenerate an electric power for storage in the battery 32.

Moreover, reverse-drive running can be established for instance by drivably rotating the second electric motor MG2 in a reverse direction with the automatic transmission 22 placed in the lower-speed gear position L. Here, the first electric motor MG1 acting as the first drive source 12, is unloaded or rendered operative to provide minimum torque, thereby permitting the output shaft 14 from rotating in a reverse direction regardless of an operative state of the engine 24.

To describe the present embodiment in detail with reference to one example of a control in the engine running mode, the hybrid drive control means 60 performs a control for improving power performance and fuel efficiency. To operate the engine 24 in an operating range with high efficiency, and to optimize distribution of the drive forces of the engine 24 and the second electric motor MG2 and a reactive force by a power generation of the first electric motor MG1.

For instance, the hybrid drive control means 60 determines a target drive-force correlated value, for instance, demanded output-shaft torque TR (corresponding to demanded drive torque) based on the accelerator displacement amount indicative of the output demand of the driver, and the vehicle speed by referring to a preliminarily stored drive-force map. Then, the hybrid drive control means 60 calculates a demanded output-shaft power on consideration of a charge demand value or the like from demanded output-shaft torque TR. Thereafter, the hybrid drive control means 60 calculates a target engine power on consideration of a transmitting fall, loads on auxiliary units, assist torque of the second electric motor MG2 and the gear position established in the automatic transmission 22 such that the relevant demanded output-shaft power can be obtained.

The hybrid drive control means 60 controls the engine 24 and controls an amount of electric power generated by the first electric motor MG1. The engine 24 is operated on an optimum fuel economy curve (fuel saving map and relationship) of the engine preliminarily obtained through an experiment conducted for realizing compatible effects of drivability and fuel saving capability on a two-dimensional coordinates defined in terms of for instance the engine rotation speed and engine torque. In addition, the engine 24 is operated at an engine rotation speed and engine torque such that the target engine power can be obtained.

The hybrid drive control means 60 allows electric energy generated by the first electric motor MG1 to be supplied to the battery 32 and the second electric motor MG2 via the inverters 30 and 40. Accordingly, a major part of drive power of the engine 24 is mechanically transmitted to the output shaft 14. Thus, a part of drive power of the engine 24 is consumed by the first electric motor MG1 for generation of electric power in conversion to electric energy. This electric energy is supplied through the inverters 30 and 40 to the second electric motor MG2, which in turn is driven to provide a drive force for transmitting to the output shaft 14. Equipments involved in generation of electric energy and consumption of electric energy by the second electric motor MG2, constitute an electrical path through which the part of drive power of the engine 24 is converted to electric energy and resulting electric energy is converted to mechanical energy. Besides the electric energy passing through the electric path, the hybrid drive control means 60 is capable of causing the battery 32 to directly supply electric energy to the second electric motor MG2 via the inverter 40 for driving the second electric motor MG2.

Further, the hybrid drive control means 60 can control the first electric motor MG1 using a differential action of the planetary gear set 26 to keep the engine rotation speed nearly constant or to control the engine rotation speed at an arbitrary value. In other words, the hybrid drive control means 60 can perform control so as to keep the engine rotation speed nearly constant or to control the same at the arbitrary value with rotatably controlling the first electric motor MG1 at an arbitrary rotation speed.

Furthermore, the hybrid drive control means 60 actuates a throttle actuator for controllably opening or closing an electronic throttle valve for a throttle control, and functionally includes engine output control means for executing an output control of the engine 24. Further, the engine output control means allows a fuel injection device to control a fuel injection amount and fuel injection timing for fuel injection control. The engine output control means outputs commands solely or in combination to an engine output control device (not shown) for controlling an ignition timing of an ignition device, such as an igniter or the like, for ignition timing control to generate required engine output.

Figure 5:
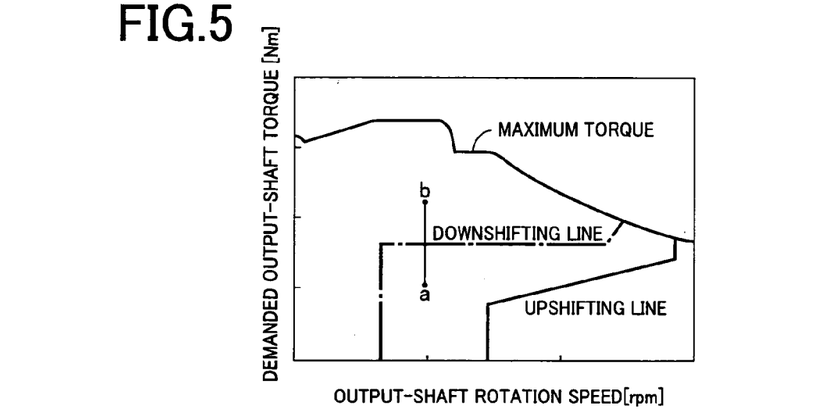
FIG. 5 is a shifting diagram to determine a shifting in the automatic transmission by referring to a preliminarily stored relationship.

Shifting control means 62 determines the shifting in the automatic transmission 22, based on a demanded output-shaft torque TR corresponding to the output-shaft rotation speed $N_{OUT}$ related to the vehicle speed V, and the demanded drive force (for instance the target drive force determined by the hybrid drive control means 60 based on the accelerator displacement amount and the vehicle speed by referring to a preliminarily stored drive force map). Then, the shifting control means 62 controls the first and second brakes B1 and B2 such that the automatic transmission 22 is shifted to a gear position determined based on the resulting determination. In FIG. 5, a solid line indicates an upshifting line on which an upshifting is performed from the lower-speed gear position L to the higher-speed gear position H. A single dot line indicates a downshifting line on which a downshifting is performed from the higher-speed gear position H to the lower-speed gear position L. A predetermined hysteresis is provided between the upshifting and the downshifting. These shifting lines indicated by the solid line and the single dot line correspond to shifting rules to perform the shifting in accordance with such shifting lines.

Further, the shifting control means 62 outputs a shifting command to a hydraulic pressure control circuit 50 of the automatic transmission 22 for switching one gear position to the other gear position being determined. The hydraulic pressure control circuit 50 drives linear solenoid valves (not shown) incorporated in the hydraulic pressure control circuit in accordance with such a shifting command to switch the first and second brakes B1 and B2 in respective operative states.

For instance, during the running of the vehicle in the lower-speed gear position L (with the second brake B2 remained engaged), if a running state of the vehicle passes across the upshifting line, then, a shifting control is executed to disengage the second brake B2 and to engage the first brake B1. Further, during the running of the vehicle in the higher-speed gear position H (with the first brake B1 remained engaged), if the running state of the vehicle passes across the downshifting line, then, another shifting control is executed to disengage the first brake B1 and to engage the second brake B2.

With the accelerator pedal 27 being depressed in operation, when the running state varies from one state "a" to another state "b" to pass across the downshifting line, a downshifting control from the higher-speed gear position H to the lower-speed gear position L, i.e., a so-called kickdown control is commenced. Then, the shifting control means 62 executes a rotation-synchronization control such that a rotation speed $N_{IN}$ (hereinafter referred to as an input-shaft rotation speed $N_{IN}$) of the input shaft 64 (see FIG. 1) of the automatic transmission 22 connected to the sun gear S2 is synchronized to a subsequent rotation speed appearing after the shifting. Here, the rotation-synchronization control can be performed in two methods including a rotation-synchronization control by the use of the second electric motor MG2 connected to the input shaft 62, and a rotation-synchronization control by a hydraulic pressure control of the automatic transmission 22.

First, the rotation-synchronization control by the second electric motor MG2 will be explained. In the rotation-synchronization control by the second electric motor MG2, a disengaging side engaging device is immediately disengaged within a shifting period to decrease or lower a torque transmitting capacity of the automatic transmission 22 to a level below a predetermined value, that is, the automatic transmission 22 is placed in a neutral state (a power transmitting interrupted state). Under such a state, a feedback control is performed by the second electric motor MG2 such that the input-shaft rotation speed $N_{IN}$ of the automatic transmission 22 coincides or matches with a target synchronization rotation speed Np determined after the downshifting being performed in the automatic transmission 22, Then the engaging side engaging device is engaged. More particularly, the output torque of the second electric motor MG2 is controlled depending on a deviation between the input-shaft rotation speed $N_{IN}$ and the target synchronization rotation speed Np. Thus, the input-shaft rotation speed $N_{IN}$ (second electric-motor rotation speed Nmg2) varies to follow the target synchronization rotation speed Np.

Figure 6:
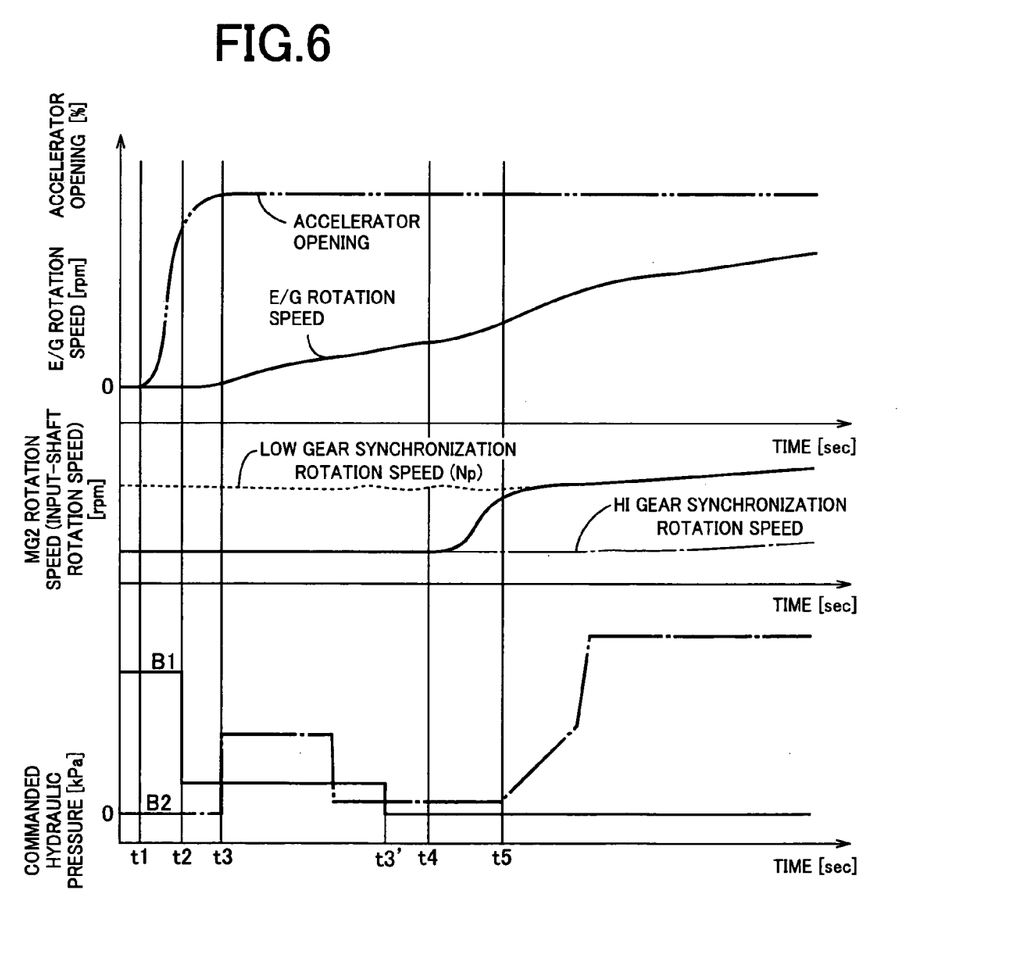
FIG. 6 is a timing chart illustrating a shifting state when a rotation-synchronization control by a second electric motor is executed in a kickdown control of the automatic transmission.

FIG. 6 is a timing chart illustrating a shifting state when the rotation-synchronization control is executed by the second electric motor MG2 during the kickdown control in the automatic transmission 22. As shown in FIG. 6, if the demanded torque exceeds a predetermined value at time t2 by depression of the accelerator pedal 27, the kickdown control is commenced. Then, at time t3', an engaging or coupling hydraulic pressure of the first brake B1 acting as the disengaging side engaging device is caused to rapidly drop as shown by a solid line, so that the first brake B1 is rapidly disengaged to interrupt the power transmitting in the automatic transmission 22. Further, the hydraulic pressures of the first and second brakes B1 and B2 shown in FIG. 6 represent commanded hydraulic pressures, respectively. At time t3, further, an engaging pressure of the second brake B2 acting as the engaging side engaging device is rapidly increased as shown by a single dot line. This accelerates the rising of an actual hydraulic pressure of the second brake B2 to execute a so-called fast fill for filling a pack clearance of the second brake B2.

Upon completion of the fast fill, the engaging pressure of the second brake B2 is again dropped to a standby pressure that is kept to the extent with no torque capacity. Under such a condition, at time t4, the rotation-synchronization control begins using the second electric motor MG2. Here, a broken line indicates the target synchronization rotation speed Np after the automatic transmission 22 is shifted to the lower-speed gear position L. The feedback control is executed by the second electric motor MG2 depending on a deviation between a current input-shaft rotation speed $N_{IN}$ (second electric-motor rotation speed Nmg2) and the target synchronization rotation speed Np. As a consequence, the input-shaft rotation speed $N_{IN}$ (second electric-motor rotation speed Nmg2) is immediately synchronized with the target synchronization rotation speed Np. Further, at time t5, if a synchronization of the input-shaft rotation speed $N_{IN}$ (second electric-motor rotation speed Nmg2) with the target synchronization rotation speed Np is determined, the engaging pressure of the second brake B2 is rapidly increased and the shifting is completed.

Next, the rotation-synchronization control executed by the hydraulic pressure control of the automatic transmission 22 will be explained. The rotation-synchronization control by the hydraulic pressure control of the automatic transmission 22 is performed such that the input-shaft rotation speed $N_{IN}$ matches with the target synchronization rotation speed Np subsequent to the shifting. In this control, the hydraulic pressures of the first brake B1 (disengaging side engaging device) acting as the hydraulic type friction engaging device and the second brake B2 (engaging side engaging device) of the automatic transmission 22 are controlled, so that holding is changed with the friction engaging device being in slipping engagement (half engaged). In particular, the feedback control is executed for controlling the engaging pressures depending on for instance the deviation between the input-shaft rotation speed $N_{IN}$ and the target synchronization rotation speed Np. Thus, the input-shaft rotation speed $N_{IN}$ varies following the target synchronization rotation speed Np.

Figure 7:
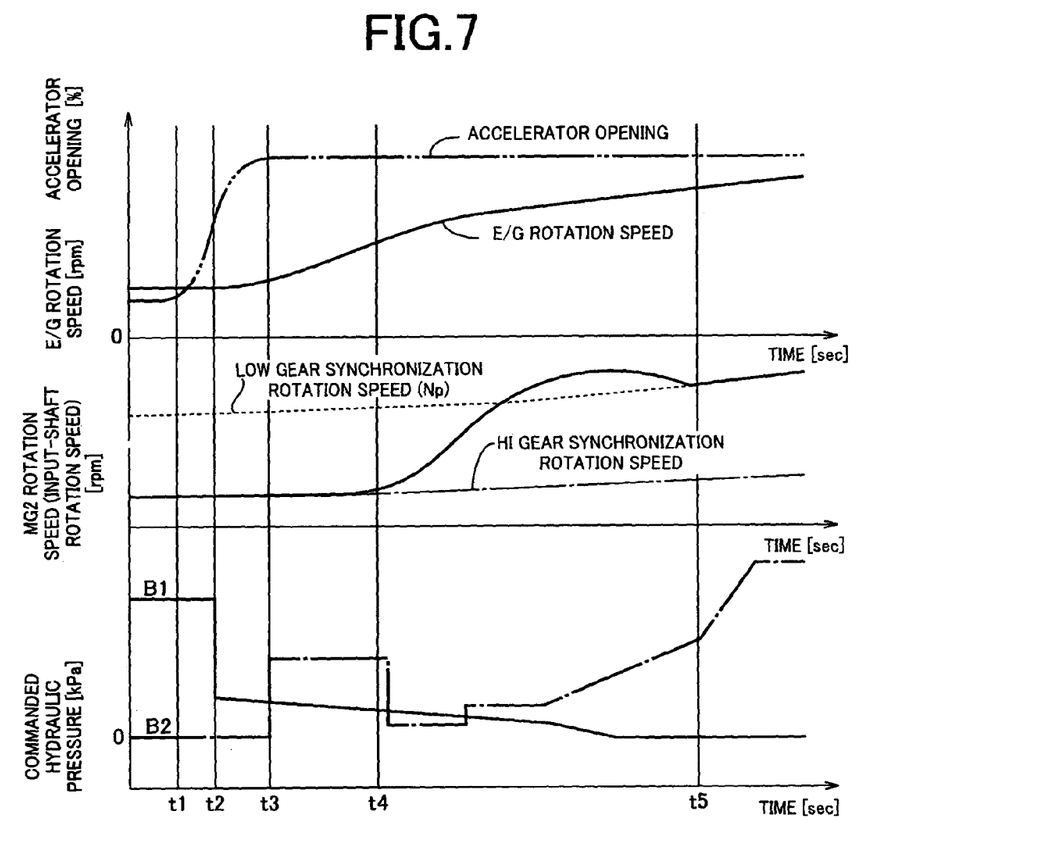
FIG. 7 is a timing chart illustrating a shifting state when a rotation-synchronization control by a hydraulic pressure control of the automatic transmission is executed in a kickdown control of the automatic transmission.

FIG. 7 is a timing chart illustrating a shifting state when the rotation-synchronization control by the hydraulic pressure control of the automatic transmission 22 is executed, during the execution of the kickdown control in the automatic transmission 22. As shown in FIG. 7, when demanded torque exceeds the predetermined value at time t2 by depression of the accelerator pedal 27, the kickdown control is commenced. Then, at time t2, the engaging pressure of the first brake B1 acting as the disengaging side engaging device is rapidly dropped to a predetermined hydraulic pressure as shown by a solid line, after which the hydraulic pressure is gradually lowered. Further, at time t3, the so-called fast fill is executed by rapidly increasing the engaging pressure of the second brake B2 acting as the engaging side engaging device to speed up the rising of an actual hydraulic pressure of the second brake B2, upon which the pack clearance of the second brake B2 is filled.

At t4, furthermore, the rotation-synchronization control by the hydraulic pressure control of the automatic transmission 22 is commenced. The hydraulic pressures of the first and second brakes B1 and B2 are subjected to feedback controls based on the deviation between the current input-shaft rotation speed $N_{IN}$ (second electric-motor rotation speed Nmg2) and the target synchronization rotation speed Np subsequent to the shifting indicated by a broken line. Thus, the input-shaft rotation speed $N_{IN}$ (second electric-motor rotation speed Nmg2) is brought into synchronization with the target synchronization rotation speed Np as shown by a solid line. At time t5, moreover, if the synchronization of the input-shaft rotation speed $N_{IN}$ (second electric-motor rotation speed Nmg2) with the target synchronization rotation speed Np is determined, the engaging pressure of the second brake B2 acting as the engaging side engaging device is raised to complete the shifting.

In the rotation-synchronization control by the second electric motor MG2, since a synchronizing control is electrically performed by the second electric motor MG2, a shorter synchronization time than that achieved in the rotation-synchronization control by the hydraulic pressure control of the automatic transmission 22 is realized. Accordingly, this provides a superior or quicker response in the shifting than that achieved in the rotation-synchronization control by the hydraulic pressure control of the automatic transmission 22. On the contrary, the rotation-synchronization control by the hydraulic pressure control of the automatic transmission 22 has a long synchronization time, resulting in the slower shifting response than that of the rotation-synchronization control by the second electric motor MG2. However, in the rotation-synchronization control executed by the second electric motor MG2, since the automatic transmission 22 is placed in the neutral state (power transmitting interrupted state) during the execution of the rotation-synchronization control, so that fall of a drive force occurs. If the kickdown control is commenced with for instance the accelerator pedal 27 remaining in a slightly depressed state, i.e., under a state provided with predetermined torque from the second electric motor MG2, a shock (shifting shock) arises due to interruption of the power transmitting of the second electric motor MG2, as the automatic transmission 22 is placed in the neutral state.

To address such a problem, synchronization-control-method switching means 66 allows the rotation-synchronization control by the second electric motor MG2 and the rotation-synchronization control by the hydraulic pressure control of the automatic transmission 22 to be suitably switched. This provides compatible effects of achieving a quickening in the response and the suppression of the shock in the kickdown shifting operation of the automatic transmission 22. Hereunder, a switching manner of the synchronizing control methods by the synchronization-control-method switching means 66 will be explained.

Turning back to FIG. 4, the downshifting determining means 68 determines as to whether the kickdown shifting is commenced in the automatic transmission 22 and whether the downshifting is under the execution in the automatic transmission 22. More particularly, the downshifting determining means 68 determines as to whether the kickdown shifting begins, depending on whether depression of the accelerator pedal 27 increases the demanded output-shaft torque TR of the driver to pass across the downshifting line of the sifting diagram shown in FIG. 5. In addition, the downshifting determining means 68 determines as to whether the downshifting is under the execution when the downshifting is commenced in the automatic transmission 22.

At the beginning of the kickdown shifting, input torque determining means 70 determines as to whether the input torque applied to the input shaft 64 of the automatic transmission 22, i.e., the output torque Tmg2 of the second electric motor MG2, are smaller than a predetermined value Ta that is preliminarily determined.

If the second electric motor MG2 has output torque Tmg2 smaller than the predetermined value Ta, then, the synchronization-control-method switching means 66 switches the control method to the rotation-synchronization control by the second electric motor MG2. In contrast, if the second electric motor MG2 has output torque Tmg2 larger than the predetermined value Ta, then, the synchronization-control-method switching means 66 switches the control method to the rotation-synchronization control by the hydraulic pressure control of the automatic transmission 22. Here, the predetermined value Ta is preliminary determined on experimental tests. In particular, the predetermined value Ta is set to a threshold value to the extent that even if the fall of the drive force (torque) occurs, the shock is small which is not noticed by the driver. Such a situation arises when the rotation-synchronization control is executed by the second electric motor MG2 with for instance a predetermined value Ta being output from the second electric motor MG2, i.e., when the power transmitting is interrupted in the automatic transmission 22 in the state where the predetermined value Ta is output from the second electric motor MG2.

Further, the predetermined value Ta may be suitably altered depending on oil temperatures, etc., of for instance hydraulic oil. More particularly, the lower the oil temperatures of hydraulic oil is, the larger the shock becomes, and hence, the predetermined value Ta is determined such that the lower the oil temperatures of hydraulic oil becomes, the smaller will be the predetermined value Ta. Under a circumstance where the automatic transmission 22 has for instance gear positions of more than three positions, the predetermined value Ta may be altered depending on a variation in speed ratio of the gear position to be shifted.

Accordingly, if the output torque Tmg2 of the second electric motor MG2 is smaller than the predetermined value Ta, the rotation-synchronization control is executed by the second electric motor MG2. Here, the fall of the drive force occurs associating with the power transmitting interruption in the automatic transmission 22. However, since the drive force is smaller than the predetermined value Ta, the rotation-synchronization control is executed in a state where the shock is not noticed by the driver. Thus, the rotation-synchronization control by the second electric motor MG2 can perform the shifting rapidly with suppressing the shock, so that the shifting response is quickened. That is, even when the second electric motor MG2 remains to provide output torque Tmg2, if its magnitude is smaller than the predetermined value Ta, then, the rotation-synchronization control is executed by the second electric motor MG2. This provides further quickened shifting response than that in the conventional art.

On the contrary, when the output torque Tmg2 of the second electric motor MG2 exceeds the predetermined value Ta, if the power transmitting is interrupted in the automatic transmission 22, then, the fall of the drive force occurs which arises the shock at a level noticeable by the driver. To avoid this, the rotation-synchronization control is executed by the hydraulic pressure control of the automatic transmission 22. Thus, the rotation-synchronization control is executed with the automatic transmission 22 having a predetermined torque transmitting capacity even during the shifting period. Accordingly, even if the kickdown shifting is performed for instance by a further depression of the accelerator pedal 27 from a depressed state, the drive force can be continuously output, so that fall of the drive force from is prevented. Thus, the occurrence of shock can be suppressed.

Figure 8:
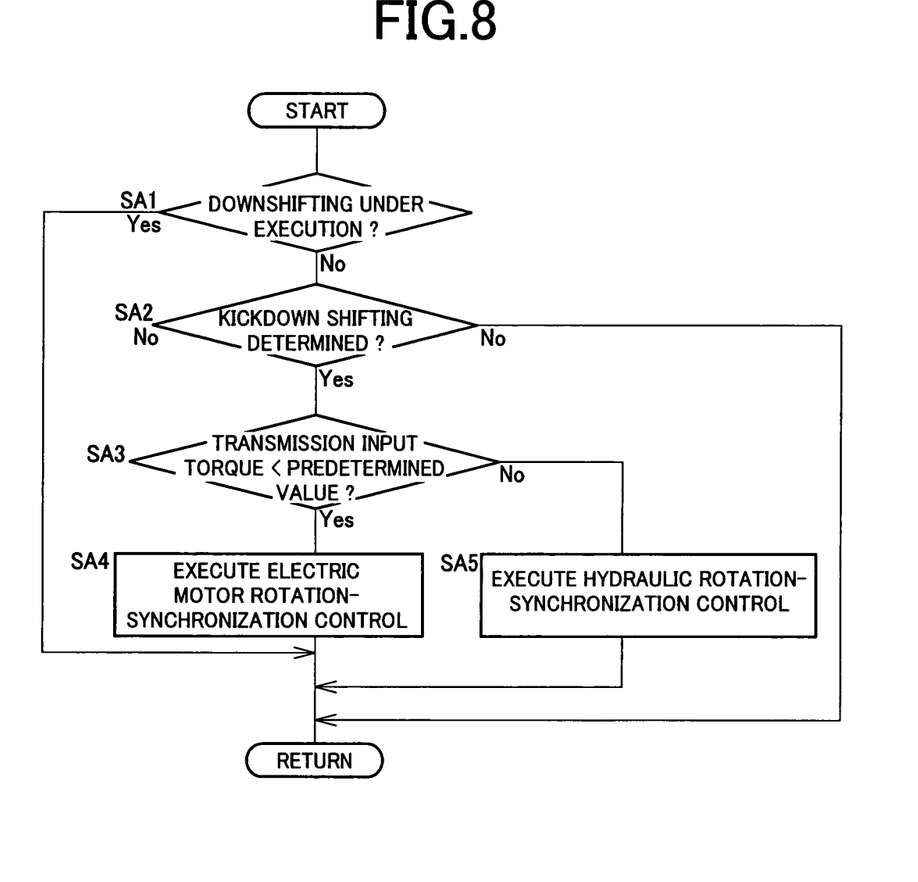
FIG. 8 is a flowchart illustrating a major part of control operations by the electronic control device, i.e., a flowchart explaining control operations enabling compatible effects of an quickened response and a suppressed shifting shock in a kickdown shifting of the automatic transmission.

FIG. 8 is a flowchart illustrating a major part of control operations, executed by the electronic control devices (28, 34 and 44), i.e., a sequence of control operations, available to provide compatible effects of quickening response and suppressing the occurrence of shock in the kickdown shifting. Such a sequence is repeatedly executed for an extremely short period of cycle time in the order of, for instance, several milliseconds or several tens milliseconds.

First, at step SA1 (hereinafter, the term "step" will be omitted) corresponding to the downshifting determining means 68, whether the automatic transmission 22 is under the execution of the downshifting is determined. If the determination in SA1 is positive, then, the current routine is terminated. If the determination in SA1 is negative, then, at SA2 corresponding to the downshifting determining means 68, whether the kickdown shifting is performed by the depressing operation of the accelerator pedal 27 is determined. If the determination in SA2 is negative, then, the current routine is terminated. If the determination in SA2 is positive and initiation of the kickdown shifting is determined, at SA3 corresponding to the synchronization-control-method switching means 66 and the input torque determining means 70, whether the input torque applied to the automatic transmission 22, i.e., the output torque Tmg2 of the second electric motor MG2 is smaller than the predetermined value Ta, is determined.

If the determination in SA3 is negative, i.e., when the output torque Tmg2 of the second electric motor MG2 is smaller than the predetermined value Ta, in SA5 the rotation-synchronization control is executed by the hydraulic pressure control of the automatic transmission 22. Here, since the automatic transmission 22 has a predetermined torque transmitting capacity, the shifting shock arising due to the torque fall of output torque Tmg2 can be suppressed.

On the contrary, if the determination in SA3 is positive, i.e., when output torque Tmg2 of the second electric motor MG2 does not exceed the predetermined value Ta, in SA4 the rotation-synchronization control is executed by the second electric motor MG2. Then, interruption of the power transmitting in the automatic transmission 22 generates the fall of output torque Tmg2. However, since the output torque Tmg2 is smaller than the predetermined value Ta, the shock arising from torque fall is small and almost no shock is noticed by the driver. Further, a synchronization time of the rotation-synchronization control executed by the second electric motor MG2 is shorter than that achieved by the rotation-synchronization control by the hydraulic pressure control of the automatic transmission 22, so that the shifting response is quickened.

As set forth above, according to the present embodiment, in the kickdown shifting of the automatic transmission 22, the synchronizing control method of the automatic transmission 22 is switched to either one of the rotation-synchronization control by the hydraulic pressure control of the automatic transmission 22 and the rotation-synchronization control by the second electric motor MG2, depending on the input torque Tmg2 applied to the automatic transmission 22 at the beginning of the shifting. Thus, an appropriate shifting is executed depending on the output torque Tmg2 of the second electric motor MG2, providing compatible effects of a quickening in the shifting response and a suppression in the shifting shock.

For instance, under a circumstance where the accelerator pedal 27 is depressed from the state with the automatic transmission applied with the small input torque Tmg2 for executing the kickdown shifting, the rotation-synchronization control is executed by the second electric motor MG2, to immediately achieve synchronized rotations. Thus, the shifting response is quickened. In addition, during the execution of the rotation-synchronization control by the second electric motor MG2, the power transmitting path is interrupted in the automatic transmission 22, resulting in fall of the drive force. However, since the input torque Tmg2 applied to the automatic transmission 22 is small, the shifting shock can be suppressed. Moreover, if the accelerator pedal 27 is depressed from the state with the automatic transmission applied with the large input torque Tmg2 for executing the kickdown shifting, the rotation-synchronization control is executed by the hydraulic pressure control of the automatic transmission 22, to continuously output the drive force. Thus, fall of drive force is avoided to suppress the shifting shock. As set forth above, switching the control methods of performing the rotation-synchronization controls of the automatic transmission 22 depending on the input torque Tmg2 applied thereto at the beginning of the shifting can render the compatible effects of a quickening in the shifting response and a suppression in the shifting shock.

According to the present embodiment, the synchronizing control method is switched to the rotation-synchronization control by the hydraulic pressure control of the automatic transmission 22 when the input torque Tmg2 applied to the automatic transmission 22 at the beginning of the kickdown shifting exceeds the predetermined value Ta, whereas the synchronizing control method is switched to the rotation-synchronization control by the second electric motor MG2 when the input torque Tmg2 does not exceed the predetermined value Ta. Therefore, if the input torque Tmg2 exceeds the predetermined value Ta, the drive force can be continuously output to avoid the drive force from falling, thereby suppressing the shifting shock.

On the contrary, if the input torque Tmg2 applied to the automatic transmission 22 at the beginning of the kickdown shifting does not exceed the predetermined value Ta, the control method is switched to the rotation-synchronization control by the second electric motor MG2 to immediately achieve the synchronized rotations. Thus, the shifting response is quickened. As set forth above, the control methods of performing the rotation-synchronization controls of the automatic transmission 22 are switched depending on whether the input torque Tmg2 applied to the automatic transmission 22 exceeds the predetermined value Ta or not, which leads to the suitable switching.

Next, another embodiment according to the present invention will be explained below. Also, parts common to those of the previous embodiment are added the same reference numerals to omit redundant description.

Embodiment 2

Figure 9:
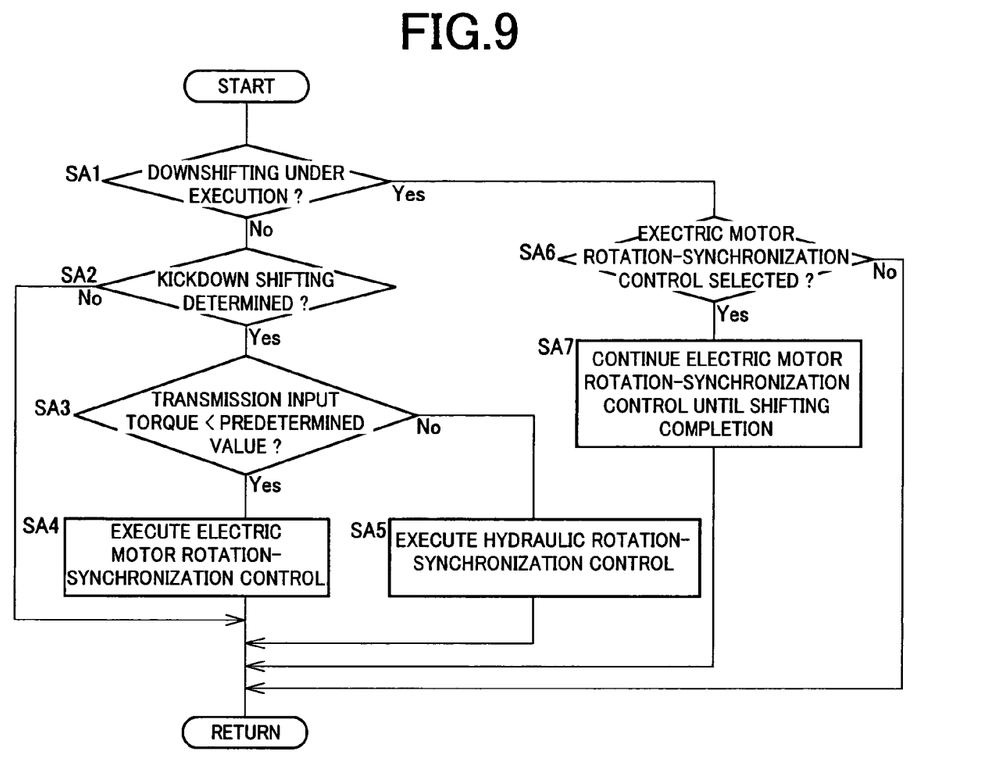
FIG. 9 is another flowchart illustrating a major part of control operations by the electronic control device, i.e., a flowchart explaining control operations enabling compatible effects of an quickened response and a suppressed shifting shock in a kickdown shifting of the automatic transmission.

FIG. 9 is a flowchart related to an another embodiment for illustrating a major part of control operations executed by the electronic control devices (28, 34 and 44), i.e., a sequence of control operations available to provide compatible effects of a quickening in response and a suppression in shock in the kickdown shifting. Also, steps SA1 to SA5 are identical to those of the embodiment 1 set forth above, and hence, description thereof is omitted.

Here, motor-synchronization control determining means 72 additionally incorporated in the present embodiment 2 as shown in FIG. 4, serves to determine as to whether the control method executed in the rotation-synchronization control belongs to the rotation-synchronization control by the second electric motor MG2, in the downshifting of the automatic transmission 22. Such a determination is made in response to a control method switching command or the like delivered from for instance the synchronization-control-method switching means 66.

Turning back to FIG. 9, if the determination in step SA1 is positive, then, at SA6 corresponding to the motor-synchronization control determining means 72, as to whether the current rotation-synchronization control occurring with the downshifting of the automatic transmission 22 is or corresponds to the rotation-synchronization control by the second electric motor MG2 is determined. If the determination in step SA6 is negative, i.e., if the rotation-synchronization control is executed by the hydraulic pressure control of the automatic transmission 22, then, the current routine is terminated.

On the contrary, if the determination in step SA6 is positive, i.e., when the control method is switched to the rotation-synchronization control by the second electric motor MG2, then, at SA7 corresponding to the synchronization-control-method switching means 66 and the shifting control means 62, the rotation-synchronization control is continuously executed by the second electric motor MG2 until the shifting is completed. Here, for instance, if the accelerator pedal 27 is depressed during the execution of the rotation-synchronization control, the rotation-synchronization control by the second electric motor MG2 is executed with priority. This provides a quickening in the shifting response, and prevents shock arising on switching the rotation-synchronization control by the second electric motor MG2 to the rotation-synchronization control by the hydraulic pressure control of the automatic transmission 22.

As set forth above, the present embodiment 2 can render the same advantageous effect as that of the embodiment 1 described above. Further, when the control method is switched to the rotation-synchronization control by the second electric motor MG2, the rotation-synchronization control is continuously executed by the second electric motor MG2 until the shifting is completed. Therefore, for instance, even if the accelerator pedal 27 is further depressed during the shifting of the automatic transmission 22, the operation is executed with priority on the rotation-synchronization control by the second electric motor MG2. Thus, the shifting response can be quickened. In addition, the shifting shock can be suppressed which is caused by switching the control method to the rotation-synchronization control by the hydraulic pressure control of the automatic transmission 22 during the execution of the rotation-synchronization control by the second electric motor MG2.

Embodiment 3

Figure 10:
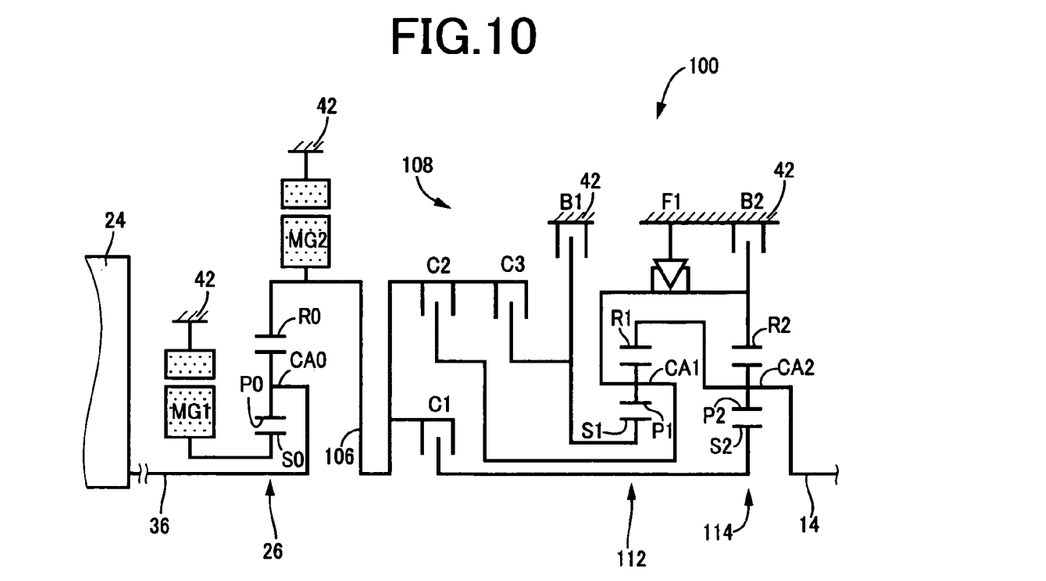
FIG. 10 is a skeleton view showing a structure of a hybrid-vehicle power transmitting apparatus of another embodiment according to the present invention.

FIG. 10 is a skeleton view showing a structure of a vehicular power transmitting apparatus (hereinafter referred to merely as a "power transmitting apparatus 100") of a still another embodiment 3 according to the present invention. In FIG. 10, the power transmitting apparatus 100 includes a crankshaft 36 acting as an input rotation member; a planetary gear unit 26 directly connected to the crankshaft 26 or indirectly connected thereto via a pulsation absorbing damper (vibration damping device) (not shown) acting as a power distributing mechanism; an automatic transmission 108 (transmission) connected to the planetary gear unit 26 in series via a transfer member 106 in a power transmitting path between the planetary gear unit 26 and drive wheels 18 and acting as a power transmitting section; and an output shaft 14 connected to the automatic transmission 108 in series to act as an output rotation member. These are disposed on a common axis in a housing 42 acting as a non-rotary member mounted on a vehicle body.

The power transmitting apparatus 100 is of the type that can be suitably applied to an FR (Front Engine and Rear Drive) installed on for instance a vehicle in a longitudinal direction thereof. The power transmitting apparatus 100 is disposed between an engine 24 comprised of an internal combustion engine such as a gasoline engine and a diesel engine or the like to serve as a drive-force source for running directly connected to the crankshaft 36 or indirectly connected thereto via the vibration absorbing damper, and a pair of drive wheels. Thus, a drive power of the engine 24 is transmitted to the pair of drive wheels 18 via a differential gear unit 16 forming part of the power transmitting path, and a pair of axles in sequence.

The planetary gear unit 26 has a carrier CAO connected to the crankshaft 36, i.e., the engine 24, a sun gear SO connected to the first electric motor MG1, and a ring gear RO connected to the transfer member 106 and the second electric motor MG2. With the planetary gear unit 26 formed in such a structure, the sun gear SO, the carrier CAO and the ring gear RO forming three rotary elements, are capable of rotating relative to each other in a differential action, i.e., the planetary gear unit 26 is placed in a differential state in the presence of a differential action. Thus, an output of the engine 24 is distributed to the first electric motor MG1 and the transmitting member 106, and a part of the output of the engine 24 drives the first electric motor MG1 to generate electric energy, which in turn is stored or is used for drivably rotating the second electric motor MG2.

The automatic transmission 108 (corresponding to the transmission of the present invention), forming a part of the power transmitting path between the engine 24 and the drive wheels 18, includes a multi-stage transmission of a planetary gear type, composed of a first planetary gear set 112 of a single pinion type and a second planetary gear set 114 of a double pinion type, which has a function to serve as a step-variable type automatic transmission. The first planetary gear set 112 includes of a first sun gear S1, a first planetary gears P1 and a carrier CA1 causing the first planetary gears P1 to rotatable about their axes and about the axis of the sun gear S1, and a first ring gear R1 held in meshing engagement with the sun gear S1 via the planetary gears P1, thereby providing a predetermined gear ratio of $\rho1$.

The second planetary gear set 114 is comprised of a second sun gear S2, second planetary gears P2 and a second carrier CA2 causing the second planetary gears P2 to rotate about their axes and about the axis of the second sun gear S2, and a second ring gear R2 held in meshing engagement with the second sun gear S2 via the second planetary gears P2, thereby providing a predetermined gear ratio of $\rho2$. Assuming that the first sun gear S1 has the number of gear teeth with ZS1, the first ring gear R1 the number of gear teeth with ZR1, the second sun gear S2 the number of gear teeth with ZS2, and the second ring gear the number of gear teeth with ZR2, the gear ratio $\rho1$ is expressed as ZS1/ZR1 and the gear ratio $\rho2$ is expressed as ZS2/ZR2.

In the automatic transmission 108, the first sun gear S1 is connected to the transmitting member 106 via a third clutch C3 and connected to the housing 42 via the first brake B1. The first carrier CA1 and the second ring gear R2 unitarily connected to each other are connected to the transmitting member 106 via the second clutch C2, and selectively connectable to the housing 42 via the second brake B2, respectively. Further, the first ring gear R1 and the second carrier CA2 are unitarily connected to each other, and the sun gear S2 is selectively connectable to the transmitting member 106 via the first clutch C1. Furthermore, the first carrier CA1 and the second ring gear R2 are connected to the housing 42 serving as a non-rotary member via a one-way clutch F1 and permitted to rotate in the same direction of the engine 24 but inhibited to rotate in reverse direction thereof. Thus, the first carrier CA1 and the second ring gear R2 function as rotary members incapable of rotating in the reverse direction.

In the automatic transmission 108, moreover, disengaging the disengaging side engaging device and engaging the engaging side engaging device execute a clutch-to-clutch shifting to selectively establish a plurality of gear positions (shifting positions). This allows a gear ratio or speed ratio $\gamma$ (rotation speed of transmitting member 106/rotation speed of output-shaft 14), varying nearly geometric series is obtained for each gear position. For instance, as indicated by an engagement operation table shown in FIG. 11, the engagement of the first clutch C1 and the one-way clutch F establishes a 1st-speed gear position. In addition, engaging the first clutch C1 and the first brake B1 establishes a 2nd-speed gear position. Moreover, engaging the first and second clutches C1 and C2 establishes a 3rd-speed gear position. Further, engaging the second clutch C2 and the first brake B1 establishes a 4th-speed gear position. Furthermore, engaging the third clutch C3 and the second brake B2 establishes a reverse-drive gear position. Moreover, disengaging the first to third clutches C1 to C3 and the first and second brakes B1 and B2 establishes a neutral "N" state. In addition, during the engine braking by the 1st-speed gear position, the second brake B2 is engaged.

Figure 11:
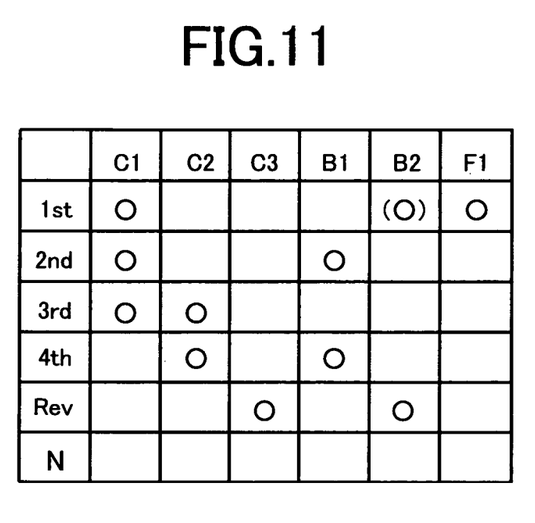
FIG. 11 is an operation diagram illustrating the relationship between a shifting operation of the automatic transmission incorporated in the hybrid-vehicle power transmitting apparatus shown in FIG. 10, and a combination in operations of hydraulic friction engaging devices used for such shifting operations.

Thus, a power transmitting path of the automatic transmission 108 can be switched between a power transmitting state enabling a power transmitting through the power transmitting path, and a power transmitting interrupting state to interrupt the power transmitting. These states are realized by combined operations in engagements and disengagements of the first to third clutches C1 to C3 and the first and second brakes B1 and B2. That is, with either one of the 1st-speed to the 4th-speed gear positions and the reverse-drive gear positions being established, the power transmitting path is brought into the power transmitting enabling state. With none of the gear positions being established for instance the neutral "N" state being established, the power transmitting path is brought into the power transmitting interrupting state.

The first to third clutches C1 to C3 and the first and second brakes B1 and B2 (hereinafter merely referred to as the "clutch C" and "brake B" unless otherwise specified) are hydraulic-type friction engaging devices acting as engaging elements frequently used in a conventional vehicular automatic transmission. Each of these engaging elements may take the form of a wet-type multi-disc type that includes a plurality of superposed friction plates pressed against each other with a hydraulic actuator; or a band brake, etc., which is comprised of a rotary drum having an outer circumferential surface on which one band or two bands are wound at ends that are tightened with a hydraulic actuator. Such a structure allows associated component parts, between which the engaging element intervenes, to be selectively connected to each other.

In the power transmitting apparatus 100 structured as mentioned above, a continuously variable transmission is formed by the planetary gear unit 26 functioning as a continuously variable transmission and the automatic transmission 108.

The power transmitting apparatus 100 of the embodiment 3, different from the power transmitting device 10 of the embodiments 1 and 2 described above, takes a structure where the second electric motor MG2 is connected to the ring gear RO of the planetary gear unit 26. The ring gear RO of the planetary gear unit 26 is not directly connected to the output shaft 14 but connected thereto via the automatic transmission 108. The present invention can be suitably applied to the power transmitting apparatus 100 formed in such a structure set forth above.

For instance, when the rotation-synchronization control is executed by the second electric motor MG2 during the downshifting of the automatic transmission 108, the power transmitting in the automatic transmission 108 is interrupted. Under such a condition, the rotation-synchronization control (feedback control) is performed by the second electric motor MG2 such that a rotation speed of the transfer member 106 matches with a target synchronization rotation speed Np that is determined after completion of the shifting in the automatic transmission 108.

Further, if the rotation-synchronization control is executed by the hydraulic pressure control of the automatic transmission 108 during the downshifting of the automatic transmission 108, the hydraulic controls of the engaging side engaging device and the disengaging side engaging device are performed for the downshifting operation. Under such a condition, the rotation-synchronization control (feedback control) is performed such that the rotation speed of the transmitting member 106 matches with the target synchronization rotation speed Np that is determined after completion of the shifting in the automatic transmission 108. By suitably switching the rotation-synchronization controls by the synchronization-control-method switching means 66, a quickening in the shifting response and suppression in the shifting shock are rendered as the compatible effects.

With the power transmitting apparatus 100 structured as set forth above, the input torque determining means 70 determines as to whether output torque transmitted from the engine 24 and the second electric motor MG2 to the transmitting member 106 is smaller than the predetermined value Ta. If the output torque is smaller than the predetermined value Ta is determined, then, the synchronization-control-method switching means 66 switches the synchronization control method to the rotation-synchronization control by the second electric motor MG2. Moreover, if the output torque is larger than the predetermined value Ta is determined, then, the synchronization-control-method switching means 66 switches the synchronization control method to the rotation-synchronization control by the hydraulic pressure control of the automatic transmission 108.

With the embodiment 3 as set forth above, even if the power transmitting apparatus 100 is structured as mentioned above, applying the synchronization-control-method switching means 66 renders the same advantageous effects as those of the embodiments described above.

In the foregoing, although the present invention has been described above with reference to the embodiments 1 to 3 shown in the drawings, the present invention may be applied in other modes.

With the embodiments mentioned above, while the automatic transmission 22 of the vehicular power transmitting apparatus 10 is the automatic transmission capable of shifting in two speeds, the present invention is not limited to the two speeds and can be applied to the automatic transmission having more than three speeds. Likewise, in the power transmitting apparatus 100, the automatic transmission is not limited to the four speeds and the automatic transmission more than two speeds is included. That is, the present invention may be freely applied to the automatic transmission of the type capable of performing the shifting in plural gear positions.

The above embodiments have been described with reference to the power transmitting apparatus of the hybrid type including the planetary gear unit 26 and the two electric motors. However, the present invention may also be applied even to a structure in which the power transmitting apparatus is of the hybrid type having one motor system or the power transmitting apparatus includes an electric motor as a drive source, provided that the power transmitting apparatus includes the automatic transmission.

In the above mentioned embodiments, when a state of charge SOC of the battery 32 drops below a predetermined value, an additional control may be executed to limit the rotation-synchronization control by the second electric motor MG2.

In the above mentioned embodiments, although the output torque Tmg2 of the second electric motor MG2 is input as the input torque to the automatic transmission 22, the input torque applied to the automatic transmission 22 is not limited to the output power of the electric motor. For instance, in the power transmitting apparatus 100 the rotation-synchronization control methods are switched depending on total input torque which is sum of those of the engine 24 and the second electric motor MG2. Thus, the input torque can be suitably altered depending on a connecting structure of the input shaft 64 of the automatic transmission 22.

It is intended that the present invention described be considered only as illustrative of one embodiment, and that the present invention may be implemented in various modifications and improvements based on knowledge of those skilled in the art.

The invention claimed is:

1. A control device for a vehicular power transmitting apparatus provided with a transmission disposed in a power transmitting path between an electric motor and drive wheels,
   the control device switching a synchronizing control method of the transmission in a kickdown shifting performed in the transmission to either one of a rotation-synchronization control by a hydraulic pressure control of the transmission and a rotation-synchronization control by the electric motor, depending on an input torque applied to the transmission at the beginning of the shifting.

2. The control device for the vehicular power transmitting apparatus according to claim 1, wherein the synchronizing control method is switched to the rotation-synchronization control by the hydraulic pressure control of the transmission when the input torque applied to the transmission at the beginning of the kickdown shifting exceeds a predetermined value, whereas the synchronizing control method is switched to the rotation-synchronization control by the electric motor when the input torque does not exceed the predetermined value.

3. The control device for the vehicular power transmitting apparatus according to claim 1, wherein when the synchronizing control method is switched to the rotation-synchronization control by the electric motor, the rotation-synchronization control by the electric motor continues until the shifting is completed in the transmission.

4. The control device for the vehicular power transmitting apparatus according to claim 2, wherein when the synchronizing control method is switched to the rotation-synchronization control by the electric motor, the rotation-synchronization control by the electric motor continues until the shifting is completed in the transmission.

* * * * *